United States Patent Office 3,752,877
Patented Aug. 14, 1973

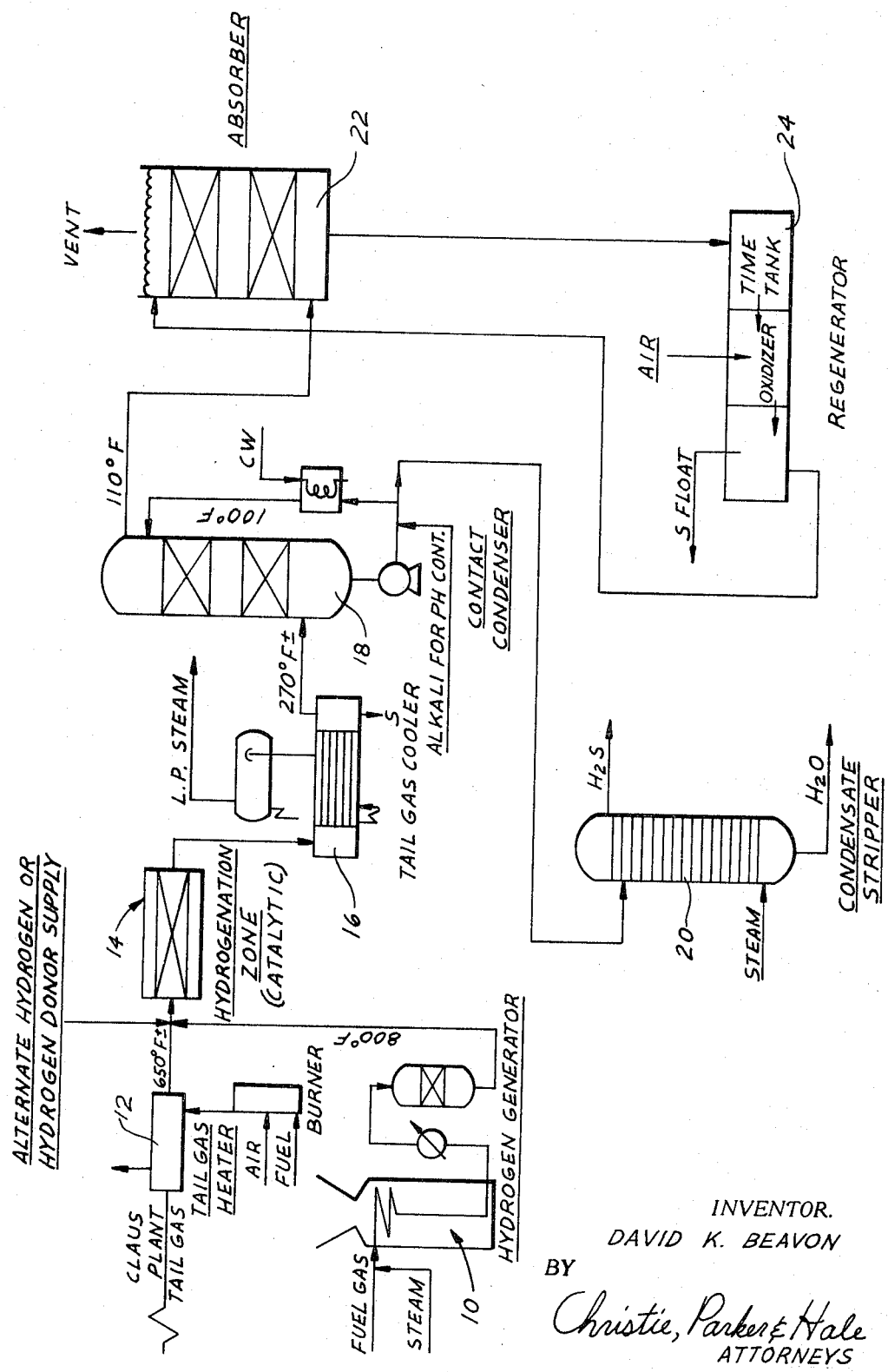

3,752,877
RECOVERY OF SULFUR COMPOUNDS
FROM TAIL GASES
David K. Beavon, Los Angeles, Calif., assignor to The
Ralph Parsons Company, Los Angeles, Calif.
Continuation-in-part of application Ser. No. 853,286,
Aug. 27, 1969. This application Mar. 19, 1971,
Ser. No. 126,280
Int. Cl. C01b 17/16
U.S. Cl. 423—244
12 Claims

ABSTRACT OF THE DISCLOSURE

Gas streams containing sulfur, water, sulfur dioxide, carbonyl sulfide, and carbon disulfide are enriched with hydrogen and catalytically hydrogenated and hydrolyzed to hydrogen sulfide which is remove.

BACKGROUND OF THE INVENTION

This is a continuation-in-part of application Ser. No. 853,286, filed Aug. 27, 1969, now abandoned.

The effluent or tail gas streams from many sulfur conversion processes contain substantial quantities of sulfur compounds. An example of this is the Claus process for converting hydrogen sulfide into elemental sulfur. The tail gas streams from a two-stage Claus or modified Claus unit typically contains five to ten percent of the sulfur fed into the unit.

When this tail gas is incinerated to convert the remaining sulfur values to sulfur dioxide, and emitted to the atmosphere, the flue gas from the incinerator will contain about 15,000 to about 30,000 parts of sulfur dioxide per million parts of dry flue gas. This concentration of sulfur dioxide is heavy when compared with the upper limits in the range of 100 p.p.m. to 500 p.p.m. set by various air pollution control authorities.

The addition of a third stage to a unit will reduce the amount of sulfur entrained and presently lost, but the loss is still in the order of three to five percent of the sulfur input.

This loss is costly and hazardous. A three-stage Claus plant, which converts, for example, a thousand tons per day of hydrogen sulfide calculated as sulfur, emits thirty to fifty tons per day sulfur in the tail gas. This tail gas is customarily incinerated, converting all of the sulfur compounds to sulfur dioxide resulting in an emission of sixty to one hundred tons per day of sulfur dioxide and presenting a most serious air pollution problem. The seriousness of this problem is further amplified when emissions from units of three thousand tons per capacity are considered.

The addition of a fourth Claus stage can reduce emission somewhat, however, emissions from a fourth stage Claus plant producing 1,000 tons of sulfur per day is still in the order of about 9,000 p.p.m. $SO_2$ which exceeds the allowable concentration about thirty-fold.

Other processes in which the presence of sulfur may only be incidental may still emit large quantities of sulfur dioxide, for example, the burning of coal commonly results in flue gases containing 1,000 to about 3,000 p.p.m. $SO_2$, about 3–10 times of what is allowable.

Despite extensive efforts to develop means to reduce emissions no practical means has been, heretofore, proposed to reduce sulfur emissions to a level of 100 to 500 p.p.m. $SO_2$. The most common expedient has been to vent the gases through high exhaust stacks which are commonly 400 to 500 feet high. These stacks merely disperse the polluting sulfur dioxide over a greater area.

SUMMARY OF THE INVENTION

It has now been found that the sulfur content of an effluent gas stream from a sulfur converting unit, such as a Claus type unit, can be reduced to negligible quantities by continuously enriching the effluent gas stream with hydrogen to provide a hydrogen at a level at least equal to the stoichiometric quantity of hydrogen required to convert the contained sulfur dioxide to hydrogen sulfide, hydrogenating the contained sulfur compounds to hydrogen sulfide at a temperature of from 300° F. to 1200° F., preferably from 300° to 800° F. Cooling the gas stream to at least the dew point of water, separating condensed water from the gas stream then removing the formed hydrogen sulfide from the cooled hydrogenated effluent gas stream. The effluent or tail gas treated in this manner will be substantially free of sulfur compounds and the hydrogen sulfide recovered can be returned to the Claus units for reprocessing to sulfur.

DRAWING

The accompanying drawing schematically depicts a preferred embodiment of a process in accordance with this invention.

DESCRIPTION

The present invention relates to a continuous process for the recovery of sulfur compounds from effluent or tail gas streams of sulfur conversion processes.

Generally, this involves steps of providing the effluent gas stream with hydrogen in an amount at least sufficient to convert the contained sulfur dioxide to hydrogen sulfide heating the hydrogen enriched gas stream to a temperature sufficient to convert entrained sulfur dioxide to hydrogen sulfide, cooling the hydrogenated stream to at least the dew point of water, separating condensed water formed as a consequence of cooling, then extracting the hydrogen sulfide from the effluent gas stream.

The equivalent sulfur dioxide contents of effluent gas streams treated in accordance with the practice of this invention may be as low as 250 p.p.m. or less, and commonly about 50 to about 100 p.p.m.

Still further reductions, to a level of 10 p.p.m., or less, may be realized by adding a second stage of catalytic hydrogenation, cooling, water condensation and hydrogen sulfide removal.

With reference to the drawing, the first step in the process is providing the effluent gas stream with sufficient hydrogen for the conversion of sulfur compounds to hydrogen sulfide. Sulfur appears in a typical effluent tail gas in one or more of the following forms: COS, $CS_2$, $SO_2$, $H_2S$, $S_2$, $S_4$, $S_6$ and $S_8$. The relative amounts contained in an effluent gas stream can be readily determined by analytical procedures. From this analysis the hydrogen requirement can be computed depending on the amount of sulfur dioxide sought to be removed. Generally a hydrogen concentration of an amount required sufficient for the reaction (1) $SO_2 + 3H_2 \longrightarrow H_2S + 2H_2O$

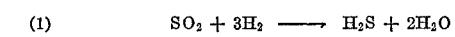

will result in a significant diminution of $SO_2$ content for air pollution purposes. While this represents the minimum amount of hydrogen required for the reaction, it is preferred to provide the gas stream with hydrogen to a level of from about 1.25 to 2.0 times that of the stoichiometric required for this reaction as this will serve to convert substantially all of the sulfur species to hydrogen sulfide, with sulfur being converted by the reaction (2) $S + H_2 \longrightarrow H_2S$

The hydrogen required for the reaction may be obtained from any convenient source, including the hydrogen which is present in the effluent gas stream as free hydrogen or available from a donor, such as carbon monoxide, which will react with water in the presence of a catalyst to yield hydrogen.

Molecular hydrogen is preferred, whether contained in the effluent gas stream or externally generated. As shown in the drawing, hydrogen may be economically and continuously produced for use in the process of this invention by concurrent reaction of a low cost hydrogen donor, such as methane or carbon monoxide, in a hydrogen generator, such as steam reformer 10, where the donor undergoes hydrogen-producing reactions such as:

(3) $CH_4 + H_2O \longrightarrow CO + 3H_2$
(4) $CO + H_2O \longrightarrow CO_2 + H_2$ at temperatures generally from about 1400° to about 1600° F. for reaction (3) and generally from about 400° to about 800° F. for reaction (4) above. The crude hydrogen output stream from the hydrogen generator is then combined with the effluent gas stream passing from heater 12 and, where desired, may be used to supply part of the heat to raise the enriched effluent gas stream to the hydrogenation temperature.

Hydrogen may also be generated externally at elevated temperatures similar to those required for reaction (3) wherein a hydrocarbon fuel such as natural gas (methane) is reacted with oxygen as provided by air to form a supply stream generally containing hydrogen, carbon monoxide, carbon dioxide and water. Where hydrogen is generated externally at elevated temperatures it is preferred to cool the gas stream to as low a hydrogenation temperature as feasible prior to introduction into the hydrogenation zone. This reduces the possibility of forming COS and $CS_2$ in the presence of CO. When COS is formed it is fairly difficult to convert to $H_2S$ and lower operating temperatures, namely in the order of about 500° F. to about 800° F. are preferred.

Alternately and equally conveniently, hydrogen may be added directly from a hydrogen cylinder (not shown) or in the form of a donor, typically a low molecular weight hydrocarbon gas stream containing, for instance, methane, ethane, propane and the like, which at temperatures from about 600° to about 1200° F., preferably from about 900° to about 1100° F., will react in situ in the presence of a hydrogenation catalyst and release hydrogen for reaction with sulfur dioxide.

As indicated, contained carbon monoxide will react with water under similar conditions and yield in situ generated hydrogen for reaction with sulfur dioxide.

The hydrogen enriched effluent or tail gas is then allowed to react in a hydrogenation zone 14 until a new equilibrium is reached. The principal reaction is the conversion of sulfur dioxide to hydrogen sulfide shown by reaction (1) given above. Hydrogenation is carried out at a temperature of from about 300° to about 1200° F., preferably from about 500° to about 1100° F., depending on the conditions and the source of hydrogen chosen. Although a catalyst is not required for hydrogenation in the presence of molecular hydrogen at temperatures above about 500° F., catalytic hydrogenation is generally required at the lower temperatures in the presence of molecular hydrogen and preferred to accelerate hydrogenation of sulfur dioxide in preference to the hydrogenation of $S_2$, $S_4$, $S_6$ and $S_8$.

Catalysts are also preferred where a donor is used for in situ generation of hydrogen as a catalyst is most effective in promoting the water gas shift reaction (4) above at temperatures from about 300° to about 800° F. which may also be the temperatures employed during hydrogenation. Useful catalysts are those containing metals of Groups $Va$, $VIa$, VIII and the Rare Earth series of the Periodic Table defined by Mendeléeff, published as the "Periodic Chart of the Atoms" by W. N. Welch Manufacturing Company and incorporated herein by reference. The catalysts may be supported or unsupported, although catalysts supported on a silica, alumina or silica-alumina base are preferred. The preferred catalysts are those containing one of more of the metals, cobalt, molybdenum, iron, chromium, vanadium, thoria, nickel, tungsten (W) and uranium (U).

The use of catalysts is also important to the promotion of the hydrogenation or hydrolysis of COS and $CS_2$ through the reactions as:

(5) $COS + H_2O \xrightarrow{(Cat.)} CO_2 + H_2S$
(6) $CS_2 + 2H_2O \longrightarrow CO_2 + 2H_2S$ When used, the catalyst is employed as the bed of the hydrogenation zone.

Hydrogenation is carried on for a time sufficient for the gas stream to approach its new chemical equilibrium. In the catalytic hydrogenation of sulfur dioxide effective and complete conversion can be realized at a space velocity of about 700 to about 3000, preferably from about 1000 to about 2000, cubic feet (calculated at standard conditions) per hour per cubic feet of catalyst. The same parameters apply to the non-catalytic hydrogenations but generally lower space velocities will be required.

When the hydrogenation reaction and any attendant hydrolysis reactions have been completed, hydrogen sulfide is recovered by extraction. Preferably, this water which will entrain some of the hydrogen sulfide as well as any unreacted sulfur compounds. Although the hydrogenated effluent or tail gas can be cooled in a single step, such as heat exchange with cooling water, it is preferred as shown in the drawing to cool the gas in two steps. First, the heat values in the tail gas are extracted and used to generate low pressure steam in a tail gas cooler 16 and then by direct contact with a circulating condensate which is externally cooled in a contact condenser 18 to condense water.

Cooling is especially preferred when the hydrogenated effluent gas contains enough formed elemental sulfur to warrant precipitation of solid sulfur when cooled to about 100° F. or less.

The condensates produced in this cooling step are of low corrosivity and easy to handle. Had the effluent gas been cooled without hydrogenation, the water condensate would, on the other hand, be highly corrosive because of the formation of sulfurous acid, polythionic acids and the like because of the presence of sulfur dioxide. Since hydrogenation essentially eliminates all the sulfur dioxide, the condensate contains essentially only hydrogen sulfide and can be handled without serious corrosion problems. Any minor amounts of sulfur dioxide, which may have escaped the hydrogenation reaction, can be controlled using minor amounts of alkaline neutralizers such as caustic soda, lime, ammonia and the like to maintain the condensate at a pH in the range of 4 to 5. The condensate is then steam stripped in a condensate stripper 20 to remove entrained hydrogen sulfide which is returned to the plant for further conversion to sulfur.

The cooled hydrogenated tail gas, which contains the balance of the hydrogen sulfide formed in the hydrogenation reaction, is then passed through an extraction zone for recovery of hydrogen sulfide. Any number of extraction methods are feasible for this step with absorption methods being preferred. For instance, the cooled tail gas may be passed through alkaline absorption solutions which are continuously regenerated by oxidation to produce elemental sulfur using catalysis such as sodium vanadate, sodium anthraquinone disulfonate, sodium arsenate, sodium ferrocyanide, iron oxide, iodine and like catalysts.

A convenient alternative is to use absorption solutions containing amines, sulfonates, potassium carbonates and like absorbents for hydrogen sulfide which can be continuously regenerated by steam stripping to produce hydrogen sulfide.

Water is always present in a Claus plant effluent because of the reactions carried as well as a consequence of air to the oxidizing system. The step of cooling the hydrogenated gas stream to at least the dew point of water and removing the water condensed is important to hydrogen sulfide extraction. First of all, the gas stream may be reduced to a temperature desirable for extraction of absorption of formed hydrogen sulfide. Since the cooled stream will be in some equilibrium with its contained water, dilution of a treating absorption solution or like due to the presence of condensable water is precluded. In addition, any trace amounts of sulfur dioxide which would react with and consume valuable treating chemicals is eliminated.

Another, but less desirable, alternative is alkaline absorption using solutions which are not regenerated, for example, caustic soda, lime and ammonium hydroxide solutions.

The absorption system depicted in the drawing is preferred. This involves the alkaline absorption of hydrogen sulfide in absorber 22 followed by regeneration in regenerator 24 by oxidation to produce sulfur. The system shown is known as the Stretford Process, which employs a solution containing sodium carbonate, sodium vanadate and sodium anthraquinone disulfonic acid as the absorbent used in the absorber. The absorbed hydrogen sulfide is oxidized by sodium vanadate to form sulfur in the absorber and time tank, and the absorbing solution is then regenerated by oxidation with air in the oxidizer. The sulfur is recovered from the solution by conventional means such as flotation, filtration, centrifuging, melting, decantation under pressure and the like. This extraction method is capable of reducing hydrogen sulfide content of the tail gas to a level of about 0.25 grain per 100 cubic feet, which represents a mere loss of sulfur as hydrogen sulfide of 21 pounds per day for a Claus plant of 1000 tons per day capacity.

The Stretford Process for stripping hydrogen sulfide from the tail gas is particularly preferred where the tail gas contains substantial quantities of carbon dioxide as this component is not extracted as in other absorption systems and material requirements are substantially reduced.

It is also feasible to conduct the absorption without specifically cooling to condense water vapor. Sodium carbonate-sodium arsenite absorption systems are functional at elevated temperatures and the process gas stream need only be cooled to the dew point of water and the water condensed at that temperature removed under conditions employed, when such absorption systems are used. Again this prevents solution dilution and consumption of valuable chemicals.

As will be readily appreciated by anyone skilled in the art, the practice of this invention offers a major improvement in process economics and materially contributes to the reduction of air pollution. For example, a typical Claus plant of 1000 tons per day capacity presently loses about 60,000 to 100,000 pounds of sulfur daily, even employing the best recovery methods heretofore available. By treating the tail gas according to the practice of this invention, total sulfur loss is reduced to about 30 pounds daily, 21 pounds of which appear as hydrogen sulfide and 8 pounds of which appear as carbonyl sulfide.

While the process has been described in terms of treatment of tail gas from the Claus and modified Claus process, it is evident that the process of this invention is utile in the treatment of any effluent or stack gas containing sulfur dioxide. Examples include stack gases from sulfur ore roasters and power plant stack gases where sulfur fuels are consumed.

The benefits derived from the practice of this invention will be further appreciated from an analysis of the appended example.

Example 1

Effluent tail gas from a three-stage modified Claus unit, having the following composition, expressed in mols per 100 mols of tail gas:

| Constituent: | Mols |
|---|---|
| $COS$ | 0.00116 |
| $CS_2$ | 0.000000009 |
| $SO_2$ | 0.144 |
| $H_2S$ | 2.49 |
| $S_2$ | 0.00744 |
| $S_4$ | 0.00207 |
| $S_6$ | 0.120 |
| $S_8$ | 0.00418 |
| $N_2$ | 54.37 |
| $CO_2$ | 5.30 |
| $CO$ | 0.000005 |
| $H_2$ | 0.00120 |
| $H_2O$ | 37.61 | was enriched with hydrogen to an amount of 0.688 mols per 100 mols of tail gas. This represented 1.63 times the theoretical hydrogen required for the conversion of sulfur dioxide to hydrogen sulfide. The tail gas was hydrogenated and brought to near equilibrium at 600° F. at an atmospheric pressure. After hydrogenation the composition of the hydrogenated effluent gas in mols per 100 mols of tail gas changed to the following:

| Constituent: | Mols |
|---|---|
| $COS$ | 0.00168 |
| $CS_2$ | 0.00000002 |
| $SO_2$ | 0.000000643 |
| $H_2S$ | 2.758 |
| $S_2$ | 0.00000307 |
| $S_4$ | 0.0000000001 |
| $S_6$ | None |
| $S_8$ | None |
| $N_2$ | 53.66 |
| $CO_2$ | 5.30 |
| $CO$ | 0.0009 |
| $H_2$ | 0.147 |
| $H_2O$ | 37.90 |

The effluent gas was cooled in a tail gas cooler to a temperature of 270° F., passed through a condenser for water and hydrogen sulfide condensation. The gas left the condenser at 110° F. and was passed to a Stretford Unit where the remaining hydrogen sulfide was absorbed prior to passing the gas to the atmosphere.

Example 2

Effluent tail gas from a modified Claus unit, having the following composition, expressed in mols per 100 mols of tail gas:

| Constituent: | Mols |
|---|---|
| $COS$ | 0.125 |
| $CS_2$ | 0.125 |
| $SO_2$ | 0.144 |
| $H_2S$ | 2.49 |
| $S_2$ (calc.) | 0.007 |
| $S_4$ (calc.) | 0.002 |
| $S_6$ (calc.) | 0.012 |
| $S_8$ (calc.) | 0.004 |
| $N_2$ | 53.38 |
| $CO_2$ | 5.30 |
| $CO$ | 0.80 |
| $H_2$ | 0.001 |
| $H_2O$ | 37.61 | was enriched with excess hydrogen to mols which represented 1.6 times the theoretical hydrogen required for the conversion of sulfur dioxide to hydrogen sulfide. The tail gas was hydrogenated over cobalt molybdate catalyst at a space velocity of 2000 cu. ft. at (S.T.P.) per hour per cu. ft. of catalyst and brought to near equilibrium at 600° F. at an atmospheric pressure. Upon hydrogenation the composition of the hydrogenated effluent gas in mols per 100 mols of tail gas changed to the following:

| Constituent: | Mols |
|---|---|
| COS | 0.006 |
| $CS_2$ | None |
| $SO_2$ | None |
| $H_2S$ | 3.13 |
| $S_2$ | None |
| $S_4$ | None |
| $S_6$ | None |
| $S_8$ | None |
| $N_2$ | 53.06 |
| $CO_2$ | 5.55 |
| CO | 0.20 |
| $H_2$ | 0.147 |
| $H_2O$ | 37.90 |

The effluent gas was cooled to 270° F. and passed through a condenser for water and hydrogen sulfide condensation. The effluent gas left having a temperature of 110° F. was passed to a Stretford Unit where the remaining hydrogen sulfide was extracted and the residual gas passed to the atmosphere. The sulfur content of the vent gas was of 100 p.p.m. COS and about 1 p.p.m. $H_2S$. The water condensate was not corrosive to ordinary steel and was purified by steam-stripping, removing the dissolved hydrogen sulfide.

What is claimed is:

1. A continuous process for reducing the sulfur content of effluent gas streams containing water, sulfur dioxide, carbonyl sulfide and carbon disulfide which comprises the steps of:
   (a) enriching the effluent gas stream with a source of hydrogen to a level which is at least equal to the stoichiometric amount of hydrogen required to convert the contained sulfur dioxide to hydrogen sulfide and water and sulfur to hydrogen sulfide and catalytically hydrogenating at least essentially all of the contained sulfur dioxide to hydrogen sulfide and water and sulfur to hydrogen sulfide and simultaneously hydrolyzing carbonyl sulfide and carbon disulfide to hydrogen sulfide at a temperature from about 300 to about 800° F., whereby contained water and water formed in the hydrogenation of sulfur dioxide to hydrogen sulfide are utilized for the hydrolysis of carbonyl sulfide and carbon disulfide;
   (b) cooling the hydrogenated gas stream to at least the dew point of water to condense water;
   (c) separating condensed water from the hydrogenated gas stream; and
   (d) treating the cooled hydrogenated gas stream to remove hydrogen sulfide.

2. A process as claimed in claim 1 in which the catalyst contains at least one metal selected from a group consisting of the Rare Earth series and Groups Va, VIa and VIII of the Periodic Table as defined by Mendeléeff.

3. A process as claimed in claim 1 in which the catalyst contains at least one of the metals selected from the group consisting of cobalt, molybdenum, iron, chromium, vanadium, thoria, nickel, tungsten and uranium.

4. A process as claimed in claim 1 in which the hydrogenation is carried out at a temperature of from about 500° to about 800° F.

5. A process as claimed in claim 1 in which the effluent gas stream is enriched with a source of hydrogen to a level which is at least about 1.25 to about 2.0 times the stoichiometric quantity of hydrogen required to convert the contained sulfur dioxide to hydrogen sulfide and water and sulfur to hydrogen sulfide.

6. A process as claimed in claim 1 in which the effluent gas stream is enriched by the addition of molecular hydrogen.

7. A process as claimed in claim 1 in which the hydrogen is provided by the reaction of carbon monoxide and water.

8. A process as claimed in claim 1 in which the formed hydrogen sulfide is extracted by contacting the hydrogenated gas stream with a hydrogen sulfide absorption solution.

9. A process as claimed in claim 8 in which the absorption solution is selected from the group consisting of aqueous alkaline solutions and aqueous alkaline salt solution.

10. A process as claimed in claim 9 in which the absorbed hydrogen sulfide is oxidized to elemental sulfur using a catalyst selected from the group consisting of sodium vanadate, sodium anthraquinone disulfonate, sodium arsenate, sodium ferrocyanide, iron oxide and iodine.

11. A process as claimed in claim 8 in which the formed water and water present in the hydrogenated effluent gas stream are condensed prior to contact with the absorption solution.

12. A continuous process for reducing the sulfur content of effluent gas streams containing water, sulfur dioxide, carbonyl sulfide and carbon disulfide which comprises the steps of:
   (a) enriching the effluent gas stream with a source of hydrogen to a level which is at least equal to the stoichiometric amount of hydrogen required to convert the contained sulfur dioxide to hydrogen sulfide and water and sulfur to hydrogen sulfide and catalytically hydrogenating at least essentially all of the contained sulfur dioxide to hydrogen sulfide and water and sulfur to hydrogen sulfide and simultaneously hydrolyzing carbonyl sulfide and carbon disulfide to hydrogen sulfide at a temperature from about 300° F. to about 800° F. utilizing a catalyst containing at least one metal selected from the group consisting of cobalt, molybdenum, iron, chromium, vanadium, thorium, nickel, tungsten and uranium, whereby contained water and water formed in the hydrogenation of sulfur dioxide to hydrogen sulfide are utilzed for the hydrolysis of carbonyl sulfide and carbon disulfide;
   (b) cooling the hydrogenated gas stream to at least the dew point of water to condense water;
   (c) separating condensed water from the hydrogenated gas stream; and
   (d) treating the cooled hydrogenated gas stream to remove hydrogen sulfide.

References Cited
UNITED STATES PATENTS

| | | | |
|---|---|---|---|
| 2,361,825 | 10/1944 | Doumani | 23—181 |
| 1,947,529 | 2/1934 | Leese | 23—226 X |
| 2,225,131 | 12/1940 | Reich | 23—225 X |
| 3,495,941 | 2/1970 | Vanhelden | 23—181 |
| 3,097,926 | 7/1963 | Nicklin et al. | 23—181 X |
| 3,476,513 | 11/1969 | Welty, Jr. et al. | 23—225 |
| 3,454,354 | 7/1969 | Kerr | 23—225 X |

GEORGE O. PETERS, Primary Examiner

U.S. Cl. X.R.

423—564, 573